United States Patent Office 3,662,071
Patented May 9, 1972

3,662,071
PHARMACEUTICAL COMPOSITION COMPRISING
CERTAIN 1,3-SUBSTITUTED GLYCOLS
Carl M. Langkammerer, Wilmington, Del., assignor to
E. I. du Pont de Nemours and Company, Wilmington,
Del.
No Drawing. Filed May 17, 1966, Ser. No. 551,884
Int. Cl. A61k 27/00
U.S. Cl. 424—275                            2 Claims This invention relates to 1,3-substituted glycols.

More specifically, this invention refers to 1,1-bis-(trihalomethyl)-1,3-glycols, compositions employing them and a process of applying these compounds to animals for the purpose of causing disability.

The compounds of this invention possess the following structural formula:

(1)
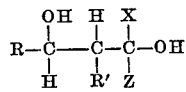

wherein

R is hydrogen, alkyl of 1 through 4 carbon atoms, alkenyl of 2 through 4 carbon atoms, naphthyl, thienyl, furyl or

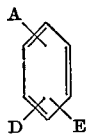

A is hydrogen, fluorine, chlorine, bromine, nitro, sulfonylamide, methyl, methoxy or phenyl;
D is hydrogen, fluorine, chlorine, bromine, nitro, sulfonylamide, methyl or methoxy;
E is hydrogen, fluorine, chlorine, bromine, nitro, sulfonylamide, methyl or methoxy;
X is trifluoromethyl or chlorodifluoromethyl;
Z is trifluoromethyl or chlorodifluoromethyl;
R' is hydrogen or alkyl of 1 through 7 carbon atoms with the limitation that unless R is hydrogen the alkyl is 1 through 3 carbon atoms; and R and R' can be cyclopentane, cyclohexane, cyclohexene, cyclododecane, tetrahydronaphthalene and norbornane.

The compounds of Formula 1 wherein R' is hydrogen or methyl are preferred because of high incidence of animal disability at low dose rates.

USE

The compounds described above cause irritation to animals, affecting the eyes and upper respiratory tract. In aerosols the compounds could be used in riot control, rodent control or burglar alarm systems.

Some of the compounds of the present invention such as 2-(2 - chloro-2,2-difluoro-1-hydroxy-1-trifluoromethyl)-ethylcyclopentanol produce desirable analgesic effects in warm blooded animals if administered in a controlled pharmaceutical dose.

PREPARATION

Compounds of the present invention are made employing a Meerwein-Pondorff process and using aluminum isopropoxide in isopropanol by reducing the adducts of hexafluoroacetone, or other halogenated acetones with aldehydes and ketones having a CH₂ group in positions alpha to the carbonyl group. The starting materials have the following structural formula:

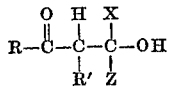

wherein R, R', A, D, E, X and Z have the same meaning as above.

COMPOSITIONS

Compounds of this invention can be administered alone but are generally contained in a composition with a pharmaceutical carrier or diluent seletced on the basis of the chosen route of administration and standard pharmaceutical practice. If the chosen route of administration is orally, the compounds can be administered in the form of tablets or capsules containing such excipients as starch, milk, sugar, clays and the like. Compounds can also be administered orally in the form of elixirs or oral suspensions containing coloring and flavoring agents.

If administered parenterally, the composition can take the form of sterile aqueous solutions containing solutes such as saline, or glucose in sufficient quantity to make the solution isotonic. For intramuscular administration, compositions of the compounds of this invention can be prepared in an oil base such as peanut or sesame oil.

If administered as a vapor or spray application through the mouth or nasal passages a composition will contain some acceptable liquid such as water, acetone, or alcohol.

DOSAGE

The amount of active ingredient in the compositions will vary from 0.005% to 95% by weight or even higher. Exact concentration of active ingredient will depend on the mechanism used for administration and will be easily understood by one knowledgeable in pharmaceutical application rates. The effective pharmaceutical dose of an intraveinous treatment is 0.5 to 5 milligrams of active compound per kilogram of body weight of the animal recipient. Amounts of over 56 milligrams per kilogram of body weight are required to kill 50% of the animal recipients.

An effective pharmaceutical dose of an inhalation treatment is 0.5 to 2 milligrams per liter of air at exposure of one minute. More than 100 milligrams per liter of air at an exposure of one minute is required to kill 50% of the animal recipients.

The following additional examples are provided to more clearly set forth the invention. All "parts" are by weight unless otherwise indicated.

EXAMPLE 1

A pressure vessel made of Hastelloy C is evacuated, cooled in a liquid nitrogen bath, and charged with 70 parts of hexafluoroacetone (seven parts excess over an equimolar quantity) and 50 parts of propiophenone. The pressure vessel is sealed, heated to 160° C. during 2 hours, held at this temperature for 4 hours, then held at 180° C. for 4 hours, cooled and vented. The resulting 111 g. of yellow liquid is distilled to give 85.6 parts (77% yield) of 2-methyl-3-hydroxy - 1 - phenyl-4,4,4-trifluoro-3-trifluoromethyl-1-butanone boiling at 70–72° C. at 0.06 mm. of mercury; $n_D^{25}$ 1.4416.

*Analysis.*—Calc'd for $C_{12}H_{10}F_6O_2$ (percent): C, 48.0; H, 3.3. Found (percent): C, 48.2; H, 3.5.

Thirty parts of 2-methyl-3-hydroxy-1-phenyl-4,4,4-trifluoro-3-trifluoromethyl-1-butanone, 30.3 parts of aluminum isopropoxide and 150 parts of dry isopropanol is placed in a flask equipped with a magnetic stirrer and attached to a Vigreaux distillation column and a receiver, the whole apparatus being protected from atmospheric moisture by $CaCl_2$ tube. A liquid consisting of acetone and isopropanol is distilled off slowly during 16 hours and the remainder removed by vacuum. The residue is warmed with 54 parts concentrated hydrochloric acid and 250 parts of water. It is extracted with ether. The ether extract is dried with anhydrous magnesium sulfate, evaporated and the residue vacuum distilled. Twenty-one parts (70% yield) of α-[(2-hydroxy-1-methyl-3,3,3-trifluoro-2-trifluoromethyl)propyl]benzyl alcohol are obtained, boiling at 98–101° C. at a pressure of 0.6 mm. of mercury; $n_D^{25}$ 1.4438.

*Analysis.*—Calc'd for $C_{12}H_{12}F_6O_2$ (percent): C, 47.6; H, 4.71. Found (percent): C, 47.4; H, 4.2.

Mice are treated by aerosol exposure to the test compound in the following manner: The compound is administered as an aerosol into a 2.8 liter chamber. The exposure chamber consists of a 2.8 liter bell jar over a nebulizer inserted through the floor of the chamber. Mice are exposed for five minutes to 200 micrograms (1000 ct.). The compound is dissolved in acetone and, during a span of twenty seconds, the compound is sprayed up into the chamber. No further air is transferred into or out of the chamber during the five minute exposure.

After this exposure, irritant activity is observed in all mice exposed, but not in controls exposed to acetone alone. Irritant activity can be described as the presence of one or more of the following reactive signs:

Hyperemia of the nose, ears, and tail
Salivation
Ptosis
Dyspnea
Decreased locomotor activity
Blinking
Hunched posture
Face pawing.

Gerbils are treated to the test compound by exposure in a 16 liter static chamber in the following manner: The compound is dissolved in methylene chloride. The resulting colorless solution is sprayed into the chamber through a port in the bottom, animals being maintained around the entrance port. The spray impinges on the top of the chamber, then slowly settles down on the gerbils in the form of a vapor. The exposure time is one minute. A concentration which shows irritant activity is 2000 micrograms. The gerbils are removed from the chamber at the end of one minute exposure. Characteristic symptoms in the gerbil after exposure to irrants are the following:

Abnormal gait, consisting of rubbing the nose on the floor while walking about (shovelnosing)
Ptosis
Face pawing
Dyspnea.

Rats are treated in a manner similar to gerbils and show the following symptoms in addition to the above:

Salivation              Piloerection
Lacrimation             Hyperactivity.

EXAMPLE 2

The Hastelloy C pressure vessel of Example 1 is evacuated, cooled in liquid nitrogen, and charged with 115 parts of hexafluoroacetone and 61 parts of pinacolone (an excess of 8 parts of hexafluoroacetone above an equimolar quantity). The pressure vessel is sealed, heated to 160° C. during 2 hours, held at this temperature for 8 hours, cooled and vented. The 174 g. of liquid obtained is distilled to give 154 parts (94% yield) of 1,1-trifluoro-2-hydroxy-5,5-dimethyl-2-trifluoromethyl - 4-hexanone with a boiling point of 52° C. at 14 mm. of mercury, $n_D^{25}$ 1.3597.

*Analysis.*—Calc'd for $C_9H_{12}F_6O_2$ (percent): C, 40.6; H, 4.5. Found (percent): C, 40.5; H, 4.7.

Twenty-six and six-tenths parts of 1,1,1-trifluoro-2-hydroxy-5,5-dimethyl-2-trifluoromethyl - 4-hexanone, 30.3 parts of aluminum isopropoxide and 150 parts of dry isopropanol are placed in a flask equipped with a magnetic stirrer and attached to a Vigreaux distillation column and a receiver protected from atmospheric moisture with a calcium chloride tube. A liquid consisting of acetone and isopropanol is distilled off slowly during 48 hours and the remainder removed by vacuum distillation. The residue is warmed with as solution of 54 parts of concentrated hydrochloric acid, cooled, extracted with ether, and the ether extract is dried with anhydrous magnesium sulfate, evaporated and the residue distilled. Twenty-one parts (75% yield) of 5,5-dimethyl-1,1,1-trifluoro-2-trifluoromethyl-2,4-hexanediol are obtained with a boiling point of 98–100° C. at a pressure of 18 mm. of mercury; M.P. 49–51° C.

*Analysis.*—Calc'd for $C_9H_{14}F_6O_2$ (percent): C, 40.3; H, 5.2. Found (percent): C, 40.3; H, 5.2.

Squirrel monkeys are exposed to the test compound in the following manner: The compound is dissolved in methylene chloride, forming a colorless solution. The solution is forced through a nebulizer, and thence to a turbulence bulb, where the compound forms particles distinct from the vapor of the solvent. Both solute and solvent vapors are blown into a fifty liter chamber containing two monkeys. The animals are exposed to a concentration of 2000 micrograms for one minute, with constant flow of compound maintaining this concentration (dynamic chamber).

At the end of the exposure, the monkeys are removed from the chamber and caged in well-ventilated quarters. Characteristic reactive signs seen in the chambers during exposure are the following:

Salivation              Lacrimation
Face pawing             Dyspnea.

EXAMPLES 3–30

The following compounds are made in the manner of the compounds of Examples 1 and 2 by substituting the appropriate starting materials of the following formula. The meaning of R, R', X and Z is found in Table I.

$$R-\overset{O}{\overset{\|}{C}}-\overset{H}{\underset{H}{C}}-R' + X-\overset{O}{\overset{\|}{C}}-Z \longrightarrow R-\overset{O}{\overset{\|}{C}}-\overset{H}{\underset{R'}{C}}-\overset{X}{\underset{Z}{C}}-OH \longrightarrow$$

$$(I) \quad + \quad (II) \quad \longrightarrow \quad (III) \quad \longrightarrow$$

$$R-\overset{OH}{\underset{H}{C}}-\overset{H}{\underset{R'}{C}}-\overset{X}{\underset{Z}{C}}-OH$$

$$(IV)$$

The compounds are formulated and applied to animals in like manner to provide like results.

The properties and analytical data for the compounds of Examples 3–30 are presented in Table II.

TABLE I

| Example No. | I R | R' | + | II X | Z | → | III | → | IV |
|---|---|---|---|---|---|---|---|---|---|
| 3 | H | n-$C_5H_{11}$ | | $CF_3$ | $CF_3$ | | $C_{10}H_{14}F_6O_2$ | | 1,1,1-trifluoro-2-trifluoromethyl-3-hydroxymethyl-2-octanol. |
| 4 | $CH_3$ | H | | $CF_3$ | $CF_3$ | | $C_6H_8F_6O_2$ | | 1,1,1-trifluoro-2-trifluoromethyl-2,4,pentanediol. |
| 5 | $(CH_3)_2C=CH-$ | H | | $CF_3$ | $CF_3$ | | $C_9H_{10}F_6O_2$ | | 1-chloro-1,1-difluoro-6-methyl-2-trifluoromethyl-5-heptene-2,4-diol. |
| 6 | $(CH_3)_2C=CH-$ | H | | $CF_2Cl$ | $CF_3$ | | $C_9H_{10}ClF_5O$ | | 1,1,1-trifluoro-2-trifluoromethyl-5-heptene-2,4-diol. |
| 7 | $C_6H_5$ | H | | $CF_3$ | $CF_3$ | | $C_{11}H_8F_6O_2$ | | 1-phenyl-4,4,4-trifluoro-3-trifluoromethyl-1,3-butanediol. |
| 8 | $C_6H_5$ | H | | $CF_2Cl$ | $CF_2Cl$ | | $C_{11}H_8Cl_2F_4$ | | 1-chloro-1,1-difluoro-2-(chlorodifluoromethyl)-4-phenyl-2,4-butanediol. |
| 9 | 3-$ClC_6H_4$ | H | | $CF_3$ | $CF_3$ | | $C_{11}H_7ClF_6O_2$ | | α-[(2-hydroxy-3,3,3-trifluoro-2-trifluoromethyl)-propyl]-m-cholrobenzyl alcohol. |
| 10 | 3-$CF_3C_6H_4$ | H | | $CF_3$ | $CF_3$ | | $C_{12}H_7F_9O_2$ | | 4,4,4-trifluoro-3-trifluoromethyl-1-[3-(α,α,α-trifluoro)-tolyl]-1,3-butanediol. |

| Example No. | I R | R' | II X | Z | III | → IV |
|---|---|---|---|---|---|---|
| 11 | 4-NO₂C₆H₄ | H | CF₃ | CF₃ | C₁₁H₇F₆NO₄ | α-[(2-hydroxy-3,3,3-trifluoro-2-trifluoromethyl)-propyl]-p-nitrobenzyl alcohol. |
| 12 | 3-NO₂C₆H₄ | H | CF₃ | CF₃ | C₁₁H₇F₆NO₄ | 1-(m-nitrophenyl)-4,4,4-trifluoro-3-trifluoromethyl-1,3-butanediol. |
| 13 | 2-thienyl | H | CF₃ | CF₃ | C₉H₆F₆O₂S | 4-(2-thienyl)-1,1,1-trifluoro-2-trifluoromethyl-2,4-butanediol. |
| 14 | C₆H₅ | CH₃ | CF₃ | CF₃ | C₁₂H₁₀Cl₂F₄O₂ | 4-chloro-3-(chlorodifluoromethyl)-4,4-difluoro-2-methyl-1-phenyl-1,3-butanediol. |
| 15 | C₆H₅ | CH₂CH₃ | CF₃ | CF₃ | C₁₃H₁₂F₆O₂ | 2-ethyl-1-phenyl-4,4,4-trifluoro-3-trifluoromethyl-1,3-butanediol. |
| 16 | C₆H₅ | n-C₈H₁₇ | CF₃ | CF₃ | C₁₉H₂₄F₆O₂ | α-[3-(2-hydroxy-1,1,1-trifluoro-2-trifluoromethyl)-hendecyl]-benzyl alcohol. |
| 17 | 4-Cl—C₆H₄ | CH₃ | CF₃ | CF₃ | C₁₂H₉ClF₆O₂ | 1-(4-chlorophenyl)-2-methyl-4,4,4-trifluoro-3-trifluoromethyl-1,3-butanediol. |
| 18 | 4-Cl—C₆H₄ | CH₂CH₃ | CF₃ | CF₃ | C₁₃H₁₁ClF₆O₂ | 1-(p-chlorophenyl)-2-ethyl-4,4,4-trifluoro-3-trifluoromethyl-1,3-butanediol. |
| 19 | 4-F—C₆H₄ | CH₃ | CF₃ | CF₃ | C₁₂H₉F₇O₂ | 1-(4-fluorophenyl)-2-methyl-4,4,4-trifluoro-3-trifluoromethyl-1,3-butanediol. |
| 20 | 4-F—C₆H₄ | CH₂CH₃ | CF₃ | CF₃ | C₁₃H₁₁F₇O₂ | 2-ethyl-1-(4-fluorophenyl)-4,4,4-trifluoro-3-trifluoromethyl-1,3-butanediol. |
| 21 | 4-Br—C₆H₄ | CH₃ | CF₃ | CF₃ | C₁₂H₉BrF₆O₂ | 1-(4-bromophenyl)-2-methyl-4,4,4-trifluoro-3-trifluoromethyl-1,3-butanediol. |
| 22 | 4-CH₃O—C₆H₄ | CH₃ | CF₃ | CF₃ | C₁₃H₁₂F₆O₃ | 1-(p-anisyl)-2-methyl-4,4,4-trifluoro-3-trifluoromethyl-1,3-butanediol. |
| 23 | 4-CH₃O—C₆H₄ | n-C₃H₇ | CF₃ | CF₃ | C₁₅H₁₆F₆O₃ | 1-(4-methoxyphenyl)-4,4,4-trifluoro-3-trifluoromethyl-1,3-butanediol. |
| 24 | 3-Et₂NSO₂—C₆H₄ | H | CF₃ | CF₃ | C₁₅H₁₇F₆NO₄S | N,N-diethyl-3-[(1,3-dihydroxy-4,4,4-trifluoro-3-trifluoromethyl)butyl]benzenesulfonamide. |
| 25 | C₆H₅CH=CH— | H | CF₃ | CF₃ | C₁₃H₁₀F₆O₂ | 6-phenyl-1,1,1-trifluoro-2-trifluoromethyl-5-hexene-2,4-diol. |
| 26 | C₆H₅O | H | CF₃ | CF₃ | C₁₂H₁₀F₆O₃ | 5-phenoxy-1,1,1-trifluoro-2-trifluoromethyl-2,4-pentanediol. |
| 27 | 2-furyl | H | CF₂Cl | CF₂Cl | C₉H₆Cl₂F₄O₃ | 4-chloro-4,4-difluoro-3-(chlorodifluoromethyl)-1-furyl-1,3-butanediol. |
| 28 | 2-thienyl | H | CF₂Cl | CF₂Cl | C₉H₆Cl₂F₄O₂S | 4-chloro-3-(chlorodifluoromethyl)-4,4-difluoro-1-(2-thienyl)-1,3-butanediol. |
| 29 | 2-thienyl | CH₃ | CF₃ | CF₃ | C₁₁H₈F₆O₂S | 2-methyl-1-(2-thienyl)-4,4,4-trifluoro-3-trifluoromethyl-1,3-butanediol. |
| 30 | 2-thienyl | CH₂CH₃ | CF₃ | CF₃ | C₁₁H₁₀F₆O₂S | 2-ethyl-1-(2-thienyl)-4,4,4-trifluoro-3-trifluoromethyl-1,3-butanediol. |

TABLE II

RCHOHCHR'C(CF₂X)(CF₂Y)OH compound

| Example No. | IV | Properties | Calculated C | H | Cl | N | S | Found C | H | Cl | N | S |
|---|---|---|---|---|---|---|---|---|---|---|---|---|
| 3 | 1,1,1-trifluoro-2-trifluoromethyl-3-hydroxymethyl-2-octanol | b₀.₀ 92.4°; nD²⁵ 1.3836 | 42.5 | 5.7 | | | | 42.4 | 6.7 | | | |
| 4 | 1,1,1-trifluoro-2-trifluoromethyl-2,4-pentanediol | b₃₁ 92–3°; M.P. 40–3° | 31.8 | 3.5 | | | | 30.6 | 3.9 | | | |
| 5 | 1-chloro-1,1-difluoro-6-methyl-2-trifluoromethyl-5-heptene-2,4-diol | b₀.₄ 58–65°; nD²⁵ 1.3787 | 40.6 | 4.5 | | | | 40.7 | 4.5 | | | |
| 6 | 1,1,1-trifluoro-2-trifluoromethyl-5-heptene-2,4-diol | b₂₄ 104–5°; nD²⁵ 1.4195 | 36.9 | 4.2 | 12.6 | | | 38.8 | 3.9 | 13.5 | | |
| 7 | 1-phenyl-4,4,4-trifluoro-3-trifluoromethyl-1,3-butane-diol | b₂ 104–6°; nD²⁵ 1.4326 | 44.3 | 4.0 | | | | 46.0 | 3.6 | | | |
| 8 | 1-chloro-1,1-difluoro-2-(chlorodifluoromethyl)-4-phenyl-2,4-butanediol | b₀.₀₁ 109°; nD²⁵ 1.4817 | 41.1 | 3.1 | 22.1 | | | 41.0 | 3.1 | 23.1 | | |
| 9 | α-[2-hydroxy-3,3,3-trifluoro-2-trifluoromethyl)-propyl]-m-chlorobenzyl alcohol | b₀.₁ 105–15°; M.P. 84–5° | 40.9 | 2.8 | 10.9 | | | 40.7 | 3.0 | 10.8 | | |
| 10 | 4,4,4-trifluoro-3-trifluoromethyl-1-[3-(α,α,α-trifluoro)-tolyl]-1,3-butanediol | b₁.₂ 108–10°; M.P. 72–3° | 40.5 | 2.5 | | | | 40.7 | 2.5 | | | |
| 11 | α-[(2-hydroxy-3,3,3-trifluoro-2-trifluoromethyl)-propyl]-p-nitrobenzyl alcohol | M.P. 148–50° | 39.6 | 2.7 | | 4.2 | | 39.6 | 2.9 | | 4/5 | |
| 12 | 1-(m-nitrophenyl)-4,4,4-trifluoro-3-trifluoromethyl-1,3-butanediol | B.P. 135–40°; M.P. 112–6° | 39.6 | 2.7 | | 4.2 | | | 2.9 | | 4.6 | |
| 13 | 4-(2-thienyl)-1,1,1-trifluoro-2-trifluoromethyl-2,4-butanediol | b₀.₁ 81–4° | 36.7 | 2.7 | | | 10.9 | 37.8 | 3.1 | | | 11.4 |
| 14 | 4-chloro-3-(chlorodifluoromethyl)-4,4-difluoro-2-methyl-1-phenyl-1,3-butanediol | b₀.₅₅ 122–5°; nD²⁵ 1.4919 | 43.0 | 3.6 | 21.2 | | | 43.3 | 3.9 | 21.5 | | |
| 15 | 2-ethyl-1-phenyl-4,4,4-trifluoro-3-trifluoromethyl-1,3-butanediol | b₀.₅₅ 89–90°; nD²⁵ 1.4462 | 49.4 | 4.4 | | | | 50.0 | 4.7 | | | |
| 16 | α-[3-(2-hydroxy-1,1,1-trifluoro-2-trifluoromethyl)hendecyl]-benzyl alcohol | b₀.₂₂ 126°; nD²⁵ 1.4568 | | | | | | | | | | |
| 17 | 1-(4-chlorophenyl)-2-methyl-4,4,4-trifluoro-3-trifluoromethyl-1,3-butanediol | b₀.₄₅ 105–6°; nD²⁵ 1.4610 | 42.7 | 3.3 | 10.6 | | | 42.9 | 3.3 | 10.8 | | |
| 18 | 1-(p-chlorophenyl)-2-ethyl-4,4,4-trifluoro-3-trifluoromethyl-1,3-butanediol | b₀.₃₅ 113–5° | 44.5 | 3.7 | 10.1 | | | 44.5 | 4.0 | 10.1 | | |
| 19 | 1-(4-fluorophenyl)-2-methyl-4,4,4-trifluoro-3-trifluoromethyl-1,3-butanediol | b₀.₅ 91–4° | 45.0 | 3.4 | | | | 45.4 | 3.3 | | | |
| 20 | 2-ethyl-1-(4-fluorophenyl)-4,4,4-trifluoro-3-trifluoromethyl-1,3-butanediol | b₀.₅ 103–6°; nD²⁵ 1.4375 | 46.7 | 3.9 | | | | 47.7 | 4.2 | | | |
| 21 | 1-(4-bromophenyl)-2-methyl-4,4,4-trifluoro-3-trifluoromethyl-1,3-butanediol | b₀.₅₅ 120–1°; M.P. 75–8° | 37.8 | 2.4 | | | | 38.2 | 3.0 | | | |
| 22 | 1-(p-anisyl)-2-methyl-4,4,4-trifluoro-3-trifluoromethyl-1,3-butanediol | b₀.₃₇ 122°; nD²⁵ 1.4567 | 47.0 | 4.2 | | | | 47.0 | 4.4 | | | |
| 23 | 1-(4-methoxyphenyl)-4,4,4-trifluoro-3-trifluoromethyl-1,3-butanediol | b₀.₆ 116–21°; M.P. 70–2° | 50.0 | 5.0 | | | | 50.0 | 4.6 | | | |
| 24 | N,N-diethyl-3-[(1,3-dihydroxy-4,4,4-trifluoro-3-trifluoromethyl)butyl]benzenesulfonamide | b₀.₁₅ 193–5° | 42.5 | 4.5 | | 3.3 | | 43.5 | 4.3 | | 3.8 | |
| 25 | 6-phenyl-1,1,1-trifluoro-2-trifluoromethyl-5-hexene-2,4-diol | b₀.₂ 106–7° | 49.7 | 3.8 | | | | 50.8 | 4.1 | | | |
| 26 | 5-phenoxy-1,1,1-trifluoro-2-trifluoromethyl-2,4-pentanediol | b₀.₁₈ 101–5°; nD²⁵ 1.4476 | 45.2 | 3.8 | | | | 45.3 | 3.9 | | | |
| 27 | 4-chloro-4,4-difluoro-3-(chlorodifluoromethyl)-1-furyl-1,3-butanediol | b₀.₃ 123–6° | 36.4 | 3.0 | 22.5 | | | 36.3 | 3.2 | 22.3 | | |
| 28 | 4-chloro-3-(chlorodifluoromethyl)-4,4-difluoro-1-(2-thienyl)-1,3-butanediol | b₀.₆ 118°; nD²⁵ 1.4972 | 33.0 | 2.4 | 21.7 | | | 33.9 | 2.4 | 22.6 | | |
| 29 | 2-methyl-1-(2-thienyl)-4,4,4-trifluoro-3-trifluoromethyl-1,3-butanediol | b₀.₅₅ 92–3°; nD²⁵ 1.4480 | 39.0 | 3.3 | | | 10.4 | 39.1 | 3.4 | | | 10.9 |
| 30 | 2-ethyl-1-(2-thienyl)-4,4,4-trifluoro-3-trifluoromethyl-1,3-butanediol | b₀.₂ 78–81° | 47.0 | 3.7 | | | | 41.8 | 3.6 | | | |

EXAMPLE 31

A Hastelloy C pressure vessel is evacuated, cooled in liquid nitrogen and charged with 63 parts of cyclopentanone and 182.5 parts of monochloropentafluoroacetone. The pressure vessel is sealed, heated to 160° C. during 2 hours and held at this temperature for 10 hours. The 238 parts of liquid obtained after cooling and venting is distilled to give 172 parts (64% yield) of 2-(2-chloro-2,2-difluoro-1-hydroxy-1-trifluoromethyl) - ethylcyclopentanone with a boiling point of 37° C. at a pressure of 0.07 mm. of mercury; $n_D^{25}$ 1.4058.

*Analysis.*—Calc'd for $C_8H_8ClF_5O_2$ (percent): C, 36.0; H, 3.0; Cl, 13.3. Found (percent): C, 35.5; H, 3.2; Cl, 13.5.

2-(2 - chloro-2,2-difluoro-1-hydroxy-1-trifluoromethyl)- ethylcyclopentanone (26.7 parts), 30.3 parts of aluminum isopropoxide and 150 parts of isopropanol are charged into a flask equipped with a magnetic stirrer and attached to a Vigreaux distillation column and a receiver protected from atmospheric moisture with a calcium chloride tube. Liquid (acetone and isopropanol) is distilled off slowly for 6 hours and the remainder removed by vacuum distillation. The residue is warmed with a solution of 54 parts of concentrated hydrochloric acid, cooled and extracted with ether. The ether extract is dried, evaporated and the residue distilled. A 69% yield (18.5 parts) of 2-(2-chloro-2,2 - difluoro-1-hydroxy-1-trifluoromethyl)ethylcyclopentanol was obtained with a boiling point of 86° C. at a pressure of 0.75 mm. of mercury; $n_D^{25}$ 1.4172.

*Analysis.*—Calc'd for $C_8H_{10}ClF_5O_2$ (percent): C, 35.7; H, 3.7. Found (percent): C, 34.5; H, 3.7.

EXAMPLES 32–36

The following compounds are made in the manner of 2-(2-chloro-2,2-difluoro-1-hydroxy - 1 - trifluoromethyl)- ethylcyclopentanol of Example 31 by substituting the appropriate starting materials for the cyclopentanone of Example 31.

TABLE III

| Example No. | Starting material | Compound | Properties | Formula | Calculated C | Calculated H | Found C | Found H |
|---|---|---|---|---|---|---|---|---|
| 32 | Cyclopentanone | 2-(2,2,2-trifluoro-1-hydroxy-1-trifluoromethyl)methylcyclopentanol | $b_{1.6}$ 75°; $n_D^{25}$ 1.3854 | $C_8H_{10}F_6O_2$ | 38.1 | 4.0 | 37.2 | 4.0 |
| 33 | Cyclododecanone | Trans-2-hydroxy-α-α,bis(trifluoromethyl)cyclododecanemethanol | M.P. 120-2° | $C_{15}H_{24}F_6O_2$ | 51.4 | 6.9 | 51.2 | 7.0 |
| | | Cis-2-hydroxy-α,α-bis(trifluoromethyl)cyclododecanemethanol | M.P. 17-91° | $C_{15}H_{24}F_6O_2$ | 51.4 | 6.9 | 51.3 | 6.9 |
| 34 | Isophorone | 6-(2,2,2-trifluoro-1-hydroxy-1-trifluoromethyl)ethyl-3,5,5-trimethyl-2-cyclohexen-1-ol | $b_{0.5}$ 86-9°; $n_D^{25}$ 1.4195 | $C_{13}H_{16}F_6O_2$ | 47.0 | 5.2 | 47.0 | 5.2 |
| 35 | Menthone | 2-[(1-hydroxy-2,2,2-trifluoro-1-trifluoromethyl)ethyl]-6-isopropyl-3-methyl-cyclohexanol | $b_{0.2}$ 90-1° | $C_{13}H_{20}F_6O_2$ | 48.4 | 6.2 | 48.3 | 6.8 |
| 36 | α-Tetralone | 2-(2,2,2-trifluoro-1-hydroxy-1-trifluoromethyl)ethyl-1,2,3,4-tetrahydro-1-naphthol | M.P. 87-9° | $C_{13}H_{12}F_6O_2$ | 50.0 | 3.8 | 49.3 | 3.8 |

What is claimed is:

1. A pharmaceutical composition comprising a pharmaceutically acceptable diluent and an effective pharmaceutical doseof a compound of the formula:

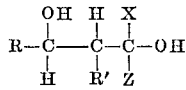

wherein

R is selected from the group consisting of hydrogen, alkyl of 1 through 4 carbon atoms, alkenyl of 2 through 4 carbon atoms, naphthyl, thienyl, furyl, and

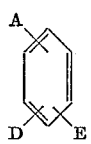

A is selected from the group consisting of hydrogen, fluorine, chlorine, bromine, nitro, sulfonylamide, methyl, methoxy and phenyl;

D and E are separately selected from the group consisting of hydrogen, fluorine, chlorine, bromine, nitro, sulfonylamide, methyl and methoxy;

X and Z are separately selected from the group consisting of trifluoromethyl and chlorodifluoromethyl;

R' is selected from the group consisting of hydrogen and alkyl of 1 through 7 carbon atoms with the limitation that unless R is hydrogen the alkyl can have only 1 through 3 carbon atoms; and R and R' are joined to form a radical selected from the group consisting of cyclopentane, cyclohexane, cyclohexene, cyclododecane, tetrahydronaphthalene and norbornane.

2. A method of producing analgesic effects in animals comprising applying to a warm-blooded animal an effective pharmaceutical dose of a compound of the formula:

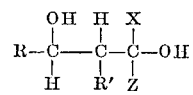

wherein

R is selected from the group consisting of hydrogen, alkyl of 1 through 4 carbon atoms, alkenyl of 2 through 4 carbon atoms, naphthyl, thienyl, furyl, and

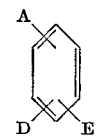

A is selected from the group consisting of hydrogen, fluorine, chlorine, bromine, nitro, sulfonylamide, methyl, methoxy and phenyl;

D and E are separately selected from the group consisting of hydrogen, fluorine, chlorine, bromine, nitro, sulfonylamide, methyl and methoxy;

X and Z are separately selected from the group consisting of trifluoromethyl and chlorodifluoromethyl;

R' is selected from the group consisting of hydrogen and alkyl of 1 through 7 carbon atoms with the limitation that unless R is hydrogen the alkyl can have only 1 through 3 carbon atoms; and R and R' are joined to form a radical selected from the group consisting of cyclopentane, cyclohexane, cyclohexene, cyclododecane, tetrahydronaphthalene and norbornane.

References Cited
UNITED STATES PATENTS 3,121,121  2/1964  Lindsey et al. _____ 260—633
3,244,707  4/1966  Dowbenko _____ 167—22

LELAND A. SEBASTIAN, Primary Examiner

U.S. Cl. X.R.

260—332.3 R, 347.8, 556 B, 611 A, 618 R, 631 R, 633; 424—285, 321, 340, 341, 343